United States Patent
Nebel et al.

(10) Patent No.: US 6,307,428 B1
(45) Date of Patent: Oct. 23, 2001

(54) METHOD FOR ASK DEMODULATION, AND ASK DEMODULATOR

(75) Inventors: Gerhard Nebel, Immenstadt; Volker Güngerich; Andreas Blum, both of München; Uwe Weder, Au; Dierk Eichner, München; Robert Reiner, Neubiberg; Gerhard Schraud, Mehring, all of (DE)

(73) Assignee: Infineon Technologies AG, Munich (DE)

( * ) Notice: Subject to any disclaimer, the term of this patent is extended or adjusted under 35 U.S.C. 154(b) by 0 days.

(21) Appl. No.: 09/850,586

(22) Filed: May 7, 2001

Related U.S. Application Data

(63) Continuation of application No. PCT/EP99/08430, filed on Nov. 3, 1999.

(30) Foreign Application Priority Data

Nov. 5, 1998 (EP) .................................................. 98120985

(51) Int. Cl.[7] .............................. H03D 1/00; H04L 25/06; H04L 27/06; G06K 7/00
(52) U.S. Cl. ............................ 329/311; 375/340; 375/353
(58) Field of Search ................................... 329/311–314; 375/320, 324, 340, 353

(56) References Cited

U.S. PATENT DOCUMENTS 4,733,191 * 3/1988 Doll ...................................... 329/109

FOREIGN PATENT DOCUMENTS

| 4001411A1 | 7/1991 | (DE) . |
| 19703967A1 | 4/1998 | (DE) . |
| 0525642 A2 | 2/1993 | (EP) . |

OTHER PUBLICATIONS

J. Bouvier et al.: "A Smart Card CMOS Circuit with Magnetic Power and Communication Interface", 1997 IEEE International Solid–State Circuits Conference, pp. 296, 297 and 474.

* cited by examiner

*Primary Examiner*—David Mis
(74) *Attorney, Agent, or Firm*—Herbert L. Lerner; Laurence A. Greenberg; Werner H. Stemer

(57) ABSTRACT

A method for demodulating a voltage which has been ASK modulated by changing the amplitude between a low level and a high level, in particular for use during contactless data transmission from a card reader/writer to a smart card, is described. The method is distinguished, in that, in an initialization phase, a first mean value is produced from the high voltage level and a stored partial voltage derived therefrom in order to detect a change to a low voltage level. The change to the low voltage level represents a start value and is detected by a subsequent comparison of the modulated voltage with the first mean value. In a subsequent demodulation phase, a second mean value is produced from the detected low voltage level and the high voltage level in order to demodulate the modulated voltage by comparing the modulated voltage with the second mean value.

6 Claims, 2 Drawing Sheets

METHOD FOR ASK DEMODULATION, AND ASK DEMODULATOR

CROSS-REFERENCE TO RELATED APPLICATION

This application is a continuation of copending International Application No. PCT/EP99/08430, filed Nov. 3, 1999, which designated the United States.

BACKGROUND OF THE INVENTION

FIELD OF THE INVENTION:

The invention relates to a method for demodulating a voltage that has been amplitude shift keying (ASK) modulated by changing the amplitude between a low level and a high level. This form of modulation is particularly suitable for use during contactless data transmission from a card reader/writer to a smart card. A demodulator is provided for carrying out the method, and also a circuit configuration for a smart card having such a demodulator is described.

Smart cards, which have an electronic chip instead of a magnetic strip, are becoming increasingly important on account of their much higher performance and the associated diverse opportunities for use. Since the smart cards are intended to be operated contactlessly once inserted into a card reader, it is necessary not only to demodulate the voltage that is received on the smart card, but also to produce therefrom the supply voltage required for the chip.

Various modulation methods are known for data transmission from the card reader to the smart card. Besides the on/off keying (OOK) modulation method, modulation by amplitude change between two levels (amplitude shift keying (ASK)) takes place particularly frequently, generally in the range from eight to twelve percent of the total amplitude and using non return to zero (NRZ) coding.

In this context, the demodulator situated on the smart card has particular requirements placed on it, since movements of the card in the transmission field of the card reader have a similar effect to modulation, but need to be distinguished therefrom. The result of this is that the demodulator circuit needs to be able to demodulate, by way of example, 10% level fluctuations of different duration (NRZ coding) for operating voltage fluctuations of different duration which are many times larger than the actual amplitude modulation. Consequently, the dynamic range of the signal that is to be demodulated is also relatively large. In addition, twice the frequency of the medium is superimposed on this signal, since the received signal is first passed via a full-wave rectifier. Published, Non-Prosecuted German Patent Application DE 197 03 967 A1 discloses a receiver with amplitude shift keying. It discloses an ASK receiver having the following features.

A signal reception section for receiving, amplifying and quantizing an ASK signal, a frequency divider for dividing a clock signal by a predetermined value, a counting section for counting the ASK signal at predetermined intervals under the control of the frequency divider, and a comparison section for comparing the count for the counting section with a reference value to ascertain whether the count lies in a predetermined range, in order to determine whether the signal is normal. In addition, a pulse detection section is provided for compensating for errors such as are produced in the comparison section by interference signals which, to some extent, are contained in the signal from the signal reception section. In addition, a counter with a random section is provided for producing a signal that simultaneously satisfies the output signals both from the comparison section and from the pulse detection section by using a clock signal whose speed is n times the transmission rate. Finally, a signal restoration section is provided for restoring the original signal from the signal of the counter with random section.

ISSCC 97, section 17.6 discloses a circuit in which the ASK modulated signal contained in the supply voltage is compared with its delayed signal using a comparator, and the digital signal is obtained therefrom. A disadvantage of this, however, is the level range within which the comparator operates, which is only small. It is then not possible to regulate the supply voltage, since this would result in the loss of the signal that is to be demodulated. Furthermore, level difference measurement is very susceptible to faults.

SUMMARY OF THE INVENTION

It is accordingly an object of the invention to provide a method for ASK demodulation, and an ASK demodulator which overcome the above-mentioned disadvantages of the prior art devices and methods of this general type, which permits much more reliable recovery of the transmitted data signal.

With the foregoing and other objects in view there is provided, in accordance with the invention, a method for demodulating a modulated voltage being amplitude shift keying (ASK) modulated by changing an amplitude between a low level and a high level. The method includes the steps of producing, in an initialization phase, a first mean value from a high voltage level and a stored partial voltage derived therefrom and comparing the modulated voltage with the first mean value to detect a change to a low voltage level of the modulated voltage. A detection of the low voltage level represents a start value. In a subsequent demodulation phase, a second mean value is generated from the low voltage level detected and the high voltage level for demodulating the modulated voltage by comparing the modulated voltage with the second mean value.

The object is achieved using a method, in which, in the initialization phase, the first mean value is produced from the high voltage level and a stored partial voltage derived therefrom in order to detect a change to a low voltage level, which represents a start value, by a subsequent comparison of the modulated voltage with the first mean value. And, in a subsequent demodulation phase, a second mean value is produced from the detected low voltage level and the high voltage level in order to demodulate the modulated voltage by a comparison with the second mean value.

A particular advantage of this solution is that there is a high level of interference immunity from spikes. This is primarily achieved by virtue of the fact that a start level is obtained not using edge detection, but rather using level measurement and from 2 of 3 level ratings.

With the foregoing and other objects in view there is provided, in accordance with the invention, a demodulator. The demodulator contains an input terminal for receiving a modulated voltage, and a capacitive voltage divider having a first capacitor and a second capacitor connected in series with the first capacitor. The capacitive voltage divider is connected to the input terminal for receiving the modulated voltage and has a tap for supplying a first mean value. A comparator having a first input is connected to the tap and receives the first mean value and a second input is connected to the input terminal for receiving the modulated voltage. A third capacitor for storing a detected low voltage level and able to be connected in parallel with the capacitive voltage divider to produce a second mean value is provided.

In accordance with an added feature of the invention, a digital circuit is connected downstream of the comparator and switches are connected to and actuated by the digital circuit. The switches are connected to the capacitive voltage divider, the comparator and the third capacitor such that, in an initialization phase, the modulated voltage is supplied to the capacitive voltage divider, and once the detected low voltage level has been stored in the third capacitor, the third capacitor is connected in parallel with the capacitive voltage divider and is connected to the first input of the comparator, while the modulated voltage is applied to the second input of the comparator.

In accordance with another feature of the invention, a diode is connected between the input terminal and the capacitive voltage divider.

In accordance with a further feature of the invention, a further comparator is provided, and the diode is a switch controlled by the further comparator.

Other features which are considered as characteristic for the invention are set forth in the appended claims.

Although the invention is illustrated and described herein as embodied in a method for ASK demodulation, and an ASK demodulator, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

Figure 1:
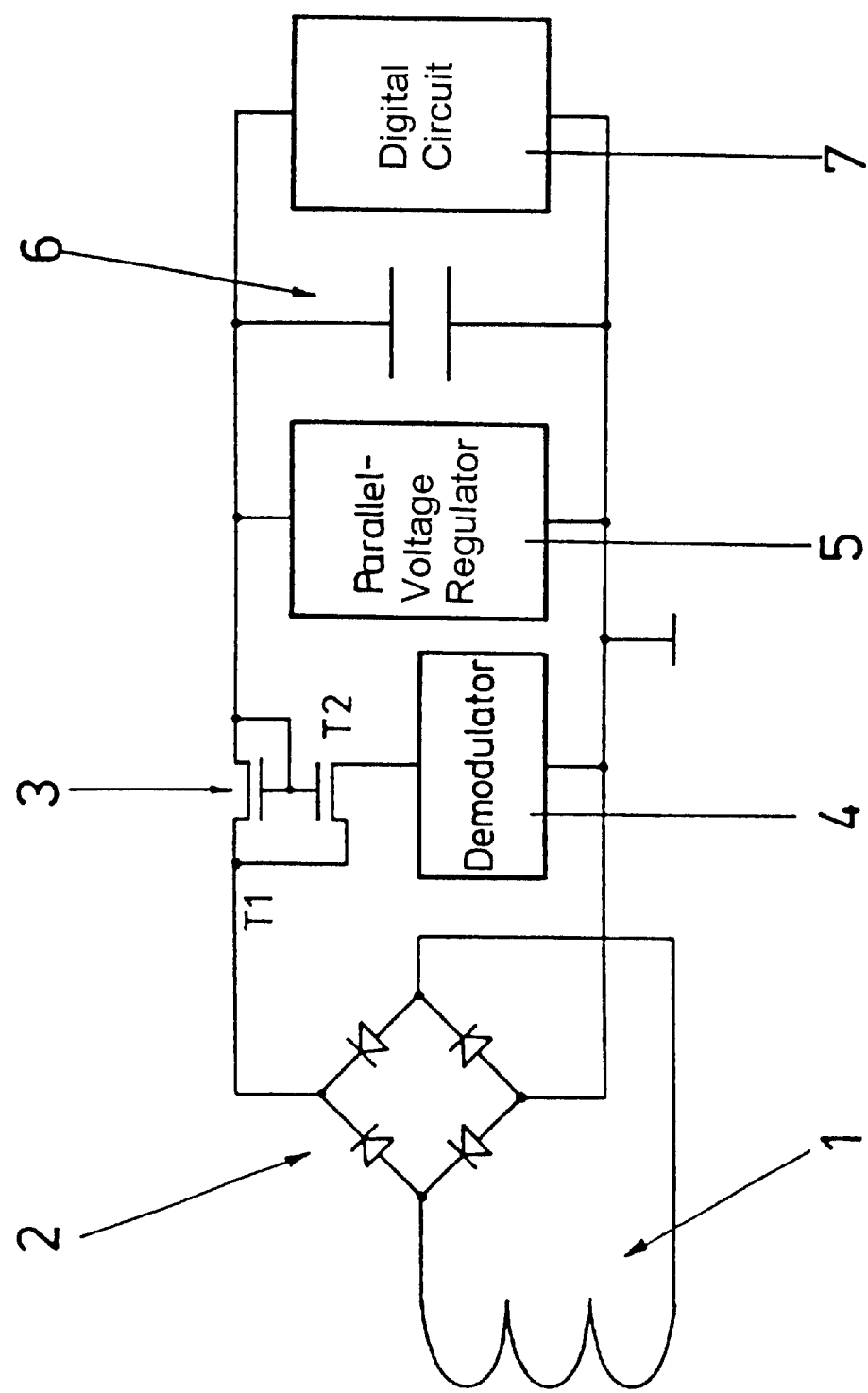
FIG. 1 is a block diagram of a circuit configuration for a smart card.

DESCRIPTION OF THE PREFERRED EMBODIMENTS:

In all the figures of the drawing, sub-features and integral parts that correspond to one another bear the same reference symbol in each case. Referring now to the figures of the drawing in detail and first, particularly, to FIG. 1 thereof, there is shown a circuit configuration containing an inductor 1 in which an electromagnetic field emitted by a card reader/writer induces an RF reception voltage when the card has been inserted into the card reader/writer. The inductor 1 is connected to a full-wave rectifier 2 (bridge rectifier). Connected to an output of the rectifier 2 is a current mirror circuit 3 which is formed from two transistors T1, T2 and is used to output a small portion of the total current and supply it to a demodulator 4. Additionally connected to the output of the rectifier 2 are a parallel voltage regulator 5 and a digital circuit 7, which contains the actual circuit for operating the smart card. Finally, a capacitor 6, which is likewise connected in parallel therewith, indicates the relatively high on-chip capacitance.

All the voltages in the circuit shown in FIG. 1 take the negative supply on the DC voltage side as a reference. The RF input voltage induced in the inductor 1 is rectified by the full-wave rectifier 2. The output of the rectifier thus produces a half-wave voltage having twice the fundamental frequency of the emitted RF voltage. The high frequency components of the voltage are smoothed or eliminated by the on-chip capacitance 6, with the parallel voltage regulator 5 producing a constant supply voltage and supplying it to the digital circuit 7. Depending on the distance between the card and the card reader/writer, a current is able to adopt values that are much higher than are required for supplying the digital circuit 7. The signal that is to be demodulated thus has a high dynamic range.

Figure 2:
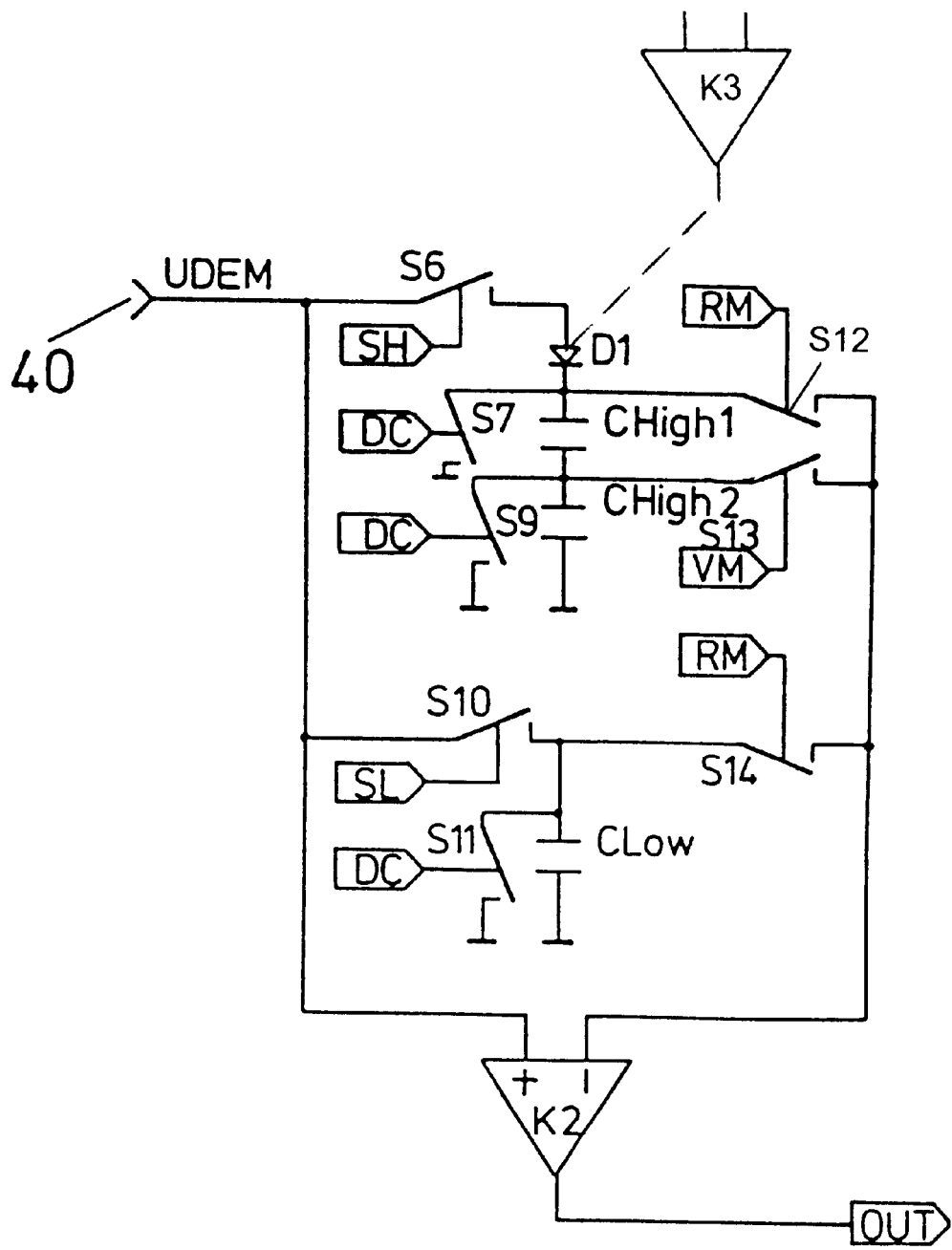
FIG. 2 is a basic circuit diagram of a demodulator according to the invention.

FIG. 2 shows an embodiment of the demodulator according to the invention. The circuit has an input 40 to which the modulated reception signal UDEM output from the current mirror circuit 3 is supplied. The input 40 is connected via a first switch S6 and a diode D1 to a first connection of a first capacitor CHigh1, whose second connection is connected to a first connection of a second capacitor CHigh2. A second connection of the second capacitor CHigh2 is connected to ground.

The first connection of the first capacitor CHigh1 can be connected via a second switch S12 to an inverting first input of a comparator K2 and via a third switch S7 to ground. A common junction point between the two capacitors CHigh1, CHigh2 can be connected via a fourth switch S13 to the inverting first input of the comparator K2 and via a fifth switch S9 to ground.

The input 40 is also connected via a sixth switch S10 to a first connection of a third capacitor CLow, whose second connection is connected to ground. The first connection of the third capacitor CLow can also be connected via a seventh switch S14 to the inverting input of the comparator K2 and via an eighth switch S11 to ground.

Finally, the input 40 is also connected to a noninverting second input of the comparator K2. The output of the comparator K2 produces the demodulated voltage.

The ASK modulated reception voltage which is output using the current mirror circuit 3 and is supplied to the input 40 contains a constant mean value and a superimposed amplitude modulated data signal. In a first initialization phase, the three capacitors are first discharged by turning on the third, fifth and eighth switches S7, S9, S11. The switches are actuated by a control signal DC which, like the other switch control signals SH, SL, VM, RM, is produced by the digital circuit 7.

During a high level of the ASK modulated voltage (top bit=1), a sampling phase then takes place after the third, fifth and eighth switches S7, S9, S11 have been turned off by the control signal DC, and the first switch S6 has been turned on by the control signal SH. The capacitive voltage divider formed from the first and the second capacitor CHigh1, CHigh2 is used to form a first (virtual) mean value, which is used to detect a low level of the ASK modulated voltage (start bit=0). For this purpose, the fourth switch S13 is turned on by the control signal VM, so that the common junction point between the first and the second capacitor is connected to the inverting first input of the comparator K2. The second and seventh switches S12, S14 are off in this csae.

So long as the modulated voltage UDEM is at its high level, the output of the comparator K2 produces a voltage having the logic value 1. If the voltage is reduced in accordance with the ASK modulation, the output of the comparator K2 produces a voltage having the logic value 0. The digital circuit 7 connected downstream now detects the low level (start bit), and the level is stored in the third capacitor CLow by virtue of the sixth switch S10 being turned on by the control signal SL. The capacitance of the capacitor CLow is fundamentally as high as the capacitance of the series circuit containing the first and second capacitors CHigh1, CHigh2.

At such a low level, the diode D1 prevents the first and second capacitors CHigh1, CHigh2 from discharging. However, since a voltage drop of approximately 0.7 V cannot be tolerated during charging, the diode is generally proven thy a switch controlled by a further comparator K3.

Next, the first, the fourth and the sixth switch S6, S13, S10 are turned off by the control signals SH, VM, SL, while the second and the seventh switch S12, S14 are turned on by the control signal RM. This forms a second mean value from the high level stored in the series circuit containing the first and the second capacitor CHigh1, CHigh2 and the low level stored in the third capacitor CLow and applies it to the inverting input of the comparator K2.

The further levels of the ASK modulated voltage which are applied to the noninverting second input of the comparator K2 are now compared with the second mean value and are passed with their full voltage swing to the output of the comparator K2.

We claim:

1. A method for demodulating a modulated voltage being amplitude shift keying (ASK) modulated by changing an amplitude between a low level and a high level, which comprises the steps of:

producing, in an initialization phase, a first mean value from a high voltage level and a stored partial voltage derived therefrom;

comparing the modulated voltage with the first mean value to detect a change to a low voltage level of the modulated voltage, a detection of the low voltage level representing a start value; and producing, in a subsequent demodulation phase, a second mean value from the low voltage level detected and the high voltage level for demodulating the modulated voltage by comparing the modulated voltage with the second mean value.

2. The method according to claim 1, wherein the modulated voltage is used for a contactless data transmission from a card reader/writer to a smart card.

3. A demodulator, comprising:

an input terminal for receiving a modulated voltage;

a capacitive voltage divider having a first capacitor and a second capacitor connected in series with said first capacitor, said capacitive voltage divider connected to said input terminal for receiving the modulated voltage and having a tap for supplying a first mean value;

a comparator having a first input connected to said tap and receiving the first mean value and a second input connected to said input terminal for receiving the modulated voltage; and a third capacitor for storing a detected low voltage level and able to be connected in parallel with said capacitive voltage divider to produce a second mean value.

4. The demodulator according to claim 3, including:

a digital circuit connected downstream of said comparator; and switches connected to and actuated by said digital circuit, said switches connected to said capacitive voltage divider, said comparator and said third capacitor such that, in an initialization phase, the modulated voltage is supplied to said capacitive voltage divider, and once the detected low voltage level has been stored in said third capacitor, said third capacitor is connected in parallel with said capacitive voltage divider and is connected to said first input of said comparator, while the modulated voltage is applied to said second input of said comparator.

5. The demodulator according to claim 3, including a diode connected between said input terminal and said capacitive voltage divider.

6. The demodulator according to claim 5, including a further comparator, and said diode is a switch controlled by said further comparator.

* * * * *